(12) United States Patent
Durrant et al.

(10) Patent No.: US 9,259,671 B2
(45) Date of Patent: Feb. 16, 2016

(54) APPARATUS, SYSTEM, AND METHOD FOR DEFOAMING A WASTE TANK

(71) Applicant: Harris Research, Inc., Logan, UT (US)

(72) Inventors: Edward E. Durrant, Paradise, UT (US); Dale S. Jensen, Smithfield, UT (US); Roger C. Andersen, Logan, UT (US)

(73) Assignee: Harris Research, Inc., Logan, UT (US)

( * ) Notice: Subject to any disclaimer, the term of this patent is extended or adjusted under 35 U.S.C. 154(b) by 457 days.

(21) Appl. No.: 13/722,924

(22) Filed: Dec. 20, 2012

(65) Prior Publication Data

US 2013/0192469 A1 Aug. 1, 2013

Related U.S. Application Data

(60) Provisional application No. 61/578,419, filed on Dec. 21, 2011.

(51) Int. Cl.
 *B01D 19/04* (2006.01)
 *H04L 12/24* (2006.01)

(52) U.S. Cl.
 CPC ............ *B01D 19/0404* (2013.01); *B01D 19/04* (2013.01); *B01D 19/0409* (2013.01); *H04L 41/065* (2013.01)

(58) Field of Classification Search
 CPC . B01D 19/04; B01D 19/0409; B01D 19/0404
 See application file for complete search history.

(56) References Cited

U.S. PATENT DOCUMENTS

| | | | | |
|---|---|---|---|---|
| 4,719,034 A | * | 1/1988 | Yamada et al. | 516/117 |
| 2009/0102085 A1 | * | 4/2009 | Stolte et al. | 264/71 |

OTHER PUBLICATIONS

Oppenheim, J.P.; Adipic Acid, Kirk Othmer Encyclopedia of Chemical Technology, 2014, p. 1-27.*

* cited by examiner

*Primary Examiner* — Robert Jones, Jr.
(74) *Attorney, Agent, or Firm* — Kunzler Law Group

(57) ABSTRACT

The present disclosure relates to a defoaming substance for defoaming an aqueous solution. The defoaming substance includes a defoaming agent and a carrier material intermixed with the defoaming agent to form a solid mass, the carrier material being at least minimally soluble in the aqueous solution. In one embodiment, the carrier material includes at least one type of organic acid. The defoaming agent may include at least one type of silicon-based defoamer. The present disclosure also relates to a method for making a defoaming substance. The method may include selecting a defoaming agent capable of hindering foam formation and reducing foam build-up in an aqueous solution, selecting a carrier material that is at least minimally soluble in the aqueous solution, combining the defoaming agent with the carrier material, and forming the combined defoaming agent and carrier material into a solid defoaming substance.

10 Claims, 4 Drawing Sheets

APPARATUS, SYSTEM, AND METHOD FOR DEFOAMING A WASTE TANK

CROSS-REFERENCES TO RELATED APPLICATIONS

This application claims the benefit of U.S. Provisional Patent Application Ser. No. 61/578,419 entitled "Apparatus, System, and Method for Defoaming a Waste Tank" and filed on Dec. 20, 2011 for Durant et. al., which is incorporated herein by reference.

FIELD

This invention relates to defoaming systems and more particularly relates to reducing aqueous foam build-up in cleaning applications.

BACKGROUND

In the cleaning industry, cleaning or foaming compounds in the form of an aqueous solution are often applied to dirty surfaces to extract dirt, oil, stains, bacteria, and other contaminants from the surfaces. For example, cleaning compounds, such as soaps, detergents, and surfactants, are used for extracting contaminants from the surface of a textile. Generally, such cleaning compounds are effective because their chemical structures include both polar (hydrophilic) and non-polar (hydrophobic) components. Therefore, cleaning compounds can be combined with a polar solvent, such as water, and are capable of dissolving and extracting non-polar solutes, such as oil, grease, dirt, and other contaminants. Once the contaminants have been extracted from the textile, the solution, now holding the suspended contaminants, can then be lifted from the textile and expelled, thus leaving behind a clean surface.

In conventional cleaning systems, the expelled cleaning solution with the suspended contaminants is often pumped or suctioned into a waste tank for temporary storage until the tank is emptied and the used cleaning solution disposed of. In such conventional systems, the solution often causes foam to build up in the waste tank. As the foam volume within the tank increases, the foam becomes susceptible to being suctioned out of the waste tank and into the vacuum blower, which can damage the blower. Additionally, any foam entering the blower can be blown or discharged out of the blower and into surrounding areas, which can soil and damage to those areas. In order to avoid the complications of foam build-up in conventional cleaning systems, users may have frequently empty the waste tank, thus resulting in bothersome and inefficient delays in the cleaning process.

Conventionally, compounds known as defoamers or defoaming agents have been employed in certain applications to reduce the build-up and formation of foam. Defoaming agents are generally liquids or powders that disperse quickly throughout aqueous solutions. Although effective at knocking-down foam, conventional defoaming agents are not well suited for certain cleaning systems. For example, if a defoaming agent is added to the waste tank of a batch cleaning system, each time the contents of the waste tank are expelled, the dissolved defoaming agent is expelled as well. Accordingly, for some systems, each time the contents of the tank are expelled, more defoaming agent must be added to the waste tank for any subsequent batch. Also, in some continuous cleaning systems, where the waste tank is continuously emptied during the cleaning process, the user must repeatedly add more defoaming agent during a single cleaning operation. Therefore, while the use of defoaming agents in some cleaning systems may be useful for reducing foam build-up, because conventional defoaming agents and systems require users to repeatedly add more defoaming agent, the increased cost, inefficiency, and difficulty of utilizing such conventional defoaming agents in known cleaning systems results in a bothersome, wasteful, and generally ineffective cleaning process.

In response to the drawbacks of conventional defoaming agents, some solid defoaming agents have been engineered to melt at low temperatures. Once the solid defoaming agent with a low melting point is added to the waste tank, the user can controllably heat the waste tank solution to the melting point of the solid defoaming agent and allow the solid defoaming agent to melt into the aqueous solution. Even though such solid defoaming agents have shown to be more effective than conventional defoaming agents because the user has more control over the dispersion rate of the defoaming agent, the additional equipment, expense, and excess energy required to heat the waste tank solution makes the implementation of such solid defoaming agents impractical and inefficient.

SUMMARY

From the foregoing discussion, it should be apparent that a need exists for an apparatus, system, and method to control the amount and dispersion of defoaming agents into an aqueous solution. The present disclosure has been developed in response to the present state of the art, and in particular, in response to the problems and needs in the art that have not yet been fully solved by currently available cleaning systems and defoaming agents. Accordingly, the present disclosure has been developed to provide an apparatus, system, and method for defoaming a waste tank that overcomes many or all of the above-discussed shortcomings in the art.

The present disclosure relates to a defoaming substance for defoaming an aqueous solution. The defoaming substance includes a defoaming agent and a carrier material intermixed with the defoaming agent to form a solid mass, the carrier material being at least minimally soluble in the aqueous solution. In one embodiment, the carrier material includes at least one type of organic acid. The defoaming agent may include at least one type of silicon-based defoamer.

The carrier material may have a water solubility in the range of between about 5 grams per liter and 1,000 grams per liter. In another embodiment, the carrier material has a water solubility in the range of between about 10 grams per liter and 500 grams per liter. In yet another embodiment, the carrier material has a water solubility of about 100 grams per liter. The carrier material may also have a melting point in the range of between about 50 degrees Celsius and 200 degrees Celsius. In another embodiment, the carrier material has a melting point of about 100 degrees Celsius.

The defoaming substance may have a mass ratio of defoaming agent to carrier material in the range of between about 1:1 and 1:100. In another embodiment, the mass ratio is between about 1:5 and 1:20. In yet another embodiment, the mass ratio is about 1:10.

The present disclosure also relates to a method for making a defoaming substance. The method may include selecting a defoaming agent capable of hindering foam formation and reducing foam build-up in an aqueous solution, selecting a carrier material that is at least minimally soluble in the aqueous solution, combining the defoaming agent with the carrier material, and forming the combined defoaming agent and carrier material into a solid defoaming substance.

In one embodiment, selecting the defoaming agent includes considering the amount and type of surfactant in the aqueous solution. Selecting the carrier material may include considering the temperature of the aqueous solution. Combining the defoaming agent with the carrier material, according to one embodiment, includes melting the carrier material and intermixing the defoaming agent and the carrier material. Once melted and mixed together, forming the mixture into a solid defoaming substance may include placing the mixture into a mold and allowing time to cool. The method may also include compression fusing the defoaming agent together with the carrier material.

The present disclosure also relates to a defoaming apparatus for defoaming an aqueous solution. The defoaming apparatus may include a defoaming agent and a carrier within which the defoaming agent is contained, the carrier providing at least a partial barrier between the defoaming agent and the aqueous solution, wherein the carrier comprises means for controllably exuding the defoaming agent into the aqueous solution. The carrier may include a container with slits that control the release of the defoaming agent. The carrier may also include a device with a variable position valve that controls the release of the defoaming agent, such as a variable position solenoid valve.

Reference throughout this specification to features, advantages, or similar language does not imply that all of the features and advantages that may be realized with the present disclosure should be or are in any single embodiment of the present application. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the present application may be combined in any suitable manner in one or more embodiments. One skilled in the relevant art will recognize that the subject matter of the present application may be practiced without one or more of the specific features or advantages of a particular embodiment. In other instances, additional features and advantages may be recognized in certain embodiments that may not be present in all embodiments of the disclosure.

These features and advantages of the present disclosure will become more fully apparent from the following description and appended claims, or may be learned by the practice of the present application as set forth hereinafter.

BRIEF DESCRIPTION OF THE DRAWINGS

In order that the advantages of the disclosure will be readily understood, a more particular description of the apparatus, systems and method briefly described above will be rendered by reference to specific embodiments that are illustrated in the appended drawings. Understanding that these drawings depict only typical embodiments of the disclosure and are not therefore to be considered to be limiting of its scope, the disclosure will be described and explained with additional specificity and detail through the use of the accompanying drawings, in which.

DETAILED DESCRIPTION

Conventional cleaning systems often involve applying cleaning solutions, such as soaps, surfactants, detergents, or other compounds, to a textile, floor, carpet, or other object to remove dirt, oil, stains, etc. Usually, after the cleaning solution has been applied, the solution is lifted from the object using a vacuum system. The used cleaning solution is then discharged into a waste tank in which foam can build up over time. Because the build-up of foam in the waste tank may produce undesirable effects (e.g., inconvenience, property damage, and equipment damage), conventional systems may employ a defoaming agent to reduce the foam build-up. Although conventional defoamers may be employed if foaming occurs, such agents fail to effectively and efficiently knock-down foam build-up in open systems or multiple batch systems without constant and repeated user monitoring, maintenance, and manually supplementing the defoaming agent with additional agent. An open system can be defined as a system where an aqueous solution flows both into and out of the system. In contrast, a multiple batch system is defined as a system where the vacuum is periodically turned off (once the used cleaning solution has substantially filled the waste tank) and the waste tank emptied before cleaning can resume. Generally, the present disclosure relates to improving conventional defoamers and defoamer systems.

Figure 1A:
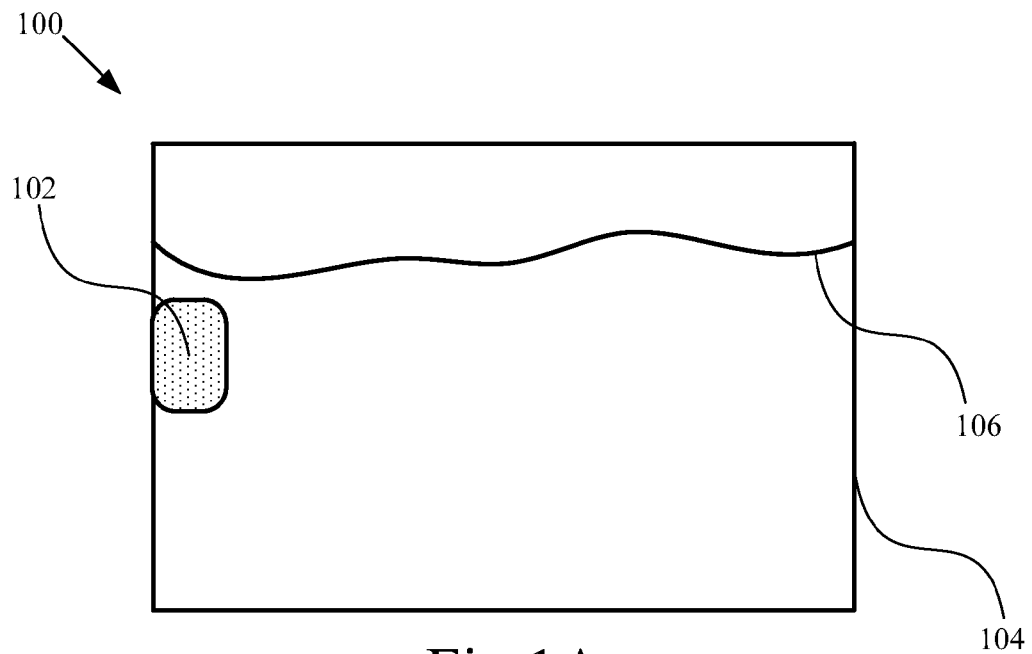
FIG. 1A is a cross-sectional view of one embodiment of a system for using a defoaming substance.

FIG. 1A is a cross-sectional view of one embodiment of a defoaming system 100. The defoaming system 100 includes a block of a defoaming substance 102. The defoaming substance 102 includes a conglomeration or mixture of a solid defoaming agent and a carrier material. The defoaming agent may be selected according to the characteristics of the cleaning system. For example, foaming in an aqueous solution may be caused by an anionic surfactant, such as sodium lauryl sulfate, therefore a defoaming agent that is effective at reducing anionic surfactant foam, such as 1920 Powdered Defoamer by Dow Corning, may be selected. In one embodiment, the defoaming agent includes a single type of defoaming compound selected for use in the defoaming block 102. In another embodiment, the defoaming agent includes multiple types of defoaming compounds selected to reduce foam caused by a complex surfactant or multiple types of surfactants. Other characteristics of an aqueous solution that may affect the selection of a defoaming agent include concentration of cleaning solution, pH, temperature, pressure, viscosity, solids content, volatiles content, and flow rate.

The carrier material may include one or more organic and/or inorganic solids. Preferably, the carrier material is at least minimally soluble in an aqueous solution at a relatively low temperature and is a solid at low to moderate temperatures. The carrier material is primarily selected according to its solubility in water. For example, sorbic acid has a water solubility of 2.5 grams per liter and glutaric acid has a water solubility of 429 grams per liter. Therefore, if sorbic acid were selected as the carrier material, a comparatively lesser amount of defoaming agent would be dispersed into the aqueous solution than if glutaric acid were selected as the carrier material.

In one embodiment, the carrier material may include a single organic acid. In another embodiment, the carrier material may include multiple organic acids. With embodiments having multiple organic acids, the user has greater control of the solubility of the final defoaming substance 102 because the solubility of the defoaming substance 102 is not limited to the solubility of a single organic acid, but the working average of multiple organic acids. In this manner, the solubility of the block can be precisely selected according to the characteristics of a particular application.

The melting temperature of the carrier material is a factor in both the making and use of the defoaming substance. Although described in greater detail below with reference to FIGS. 3 and 4, the melting temperature of the selected carrier material can be low enough so as to save on production energy costs. Also, the melting temperature can be high enough to prevent the defoaming substance from melting in the aqueous solution in the waste tank. In some embodiments, the melting temperature of the carrier material is between 50° C. and 200° C. In some more specific implementations, the melting temperature of the carrier material is between 100° C. and 150° C. Although the defoaming block 102 is termed a block, the defoaming block need not be block-shaped (i.e., a flat side object), but can have any of various shapes and be any of various sizes.

Figure 1B:
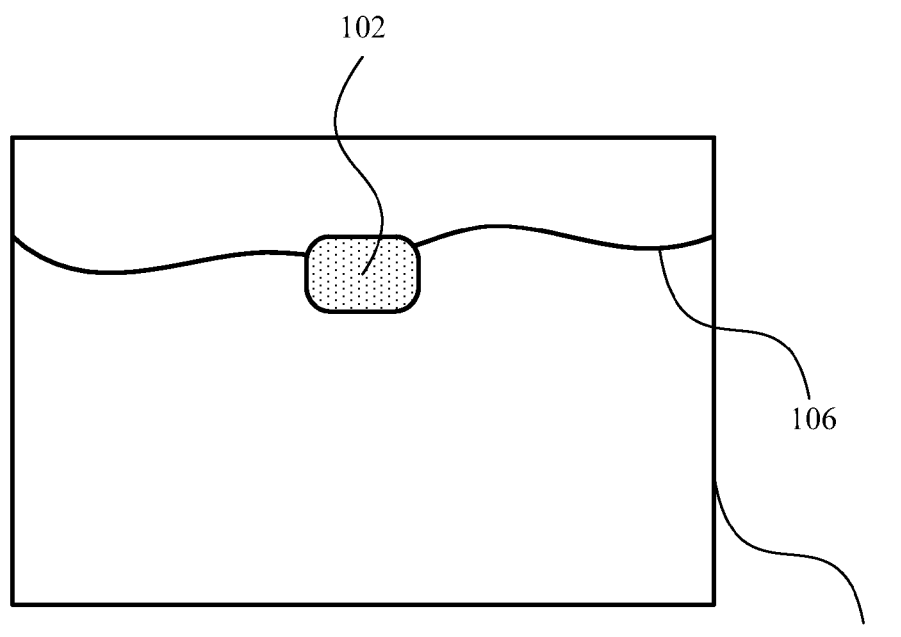
FIG. 1B is a cross-sectional view of another embodiment of a system for using a defoaming substance.

As depicted in FIG. 1A, the defoaming substance 102 may, in one embodiment, be attached to an inner wall of a vessel 104 containing an aqueous solution 106. In another embodiment, as depicted in FIG. 1B, the defoaming substance 102 may be able to freely move about the container 104, either floating on the surface of the aqueous solution 106 or wholly or partially submerged in the aqueous solution 106. It is contemplated that other positions and orientations of the defoaming substance 102 within the container 104 fall within the scope of the disclosure, provided that such other positions and orientations allow the defoaming substance 102 to be in at least partial fluid communication with the aqueous solution 106.

The container 104, in one embodiment, is a waste tank mounted in a truck or van for portable cleaning systems. In some embodiments, the container 104 includes a vacuum system where used cleaning solution is suctioned into the waste tank. In another embodiment, the container 104 has an exhaust outlet where air and/or cleaning solution may be expelled. In another embodiment, the container 104 is a small vessel within a household sized shampooing vacuum. It is contemplated that other containers, recognized by those of skill in the art, may fall within the scope of the present disclosure.

Figure 2A:
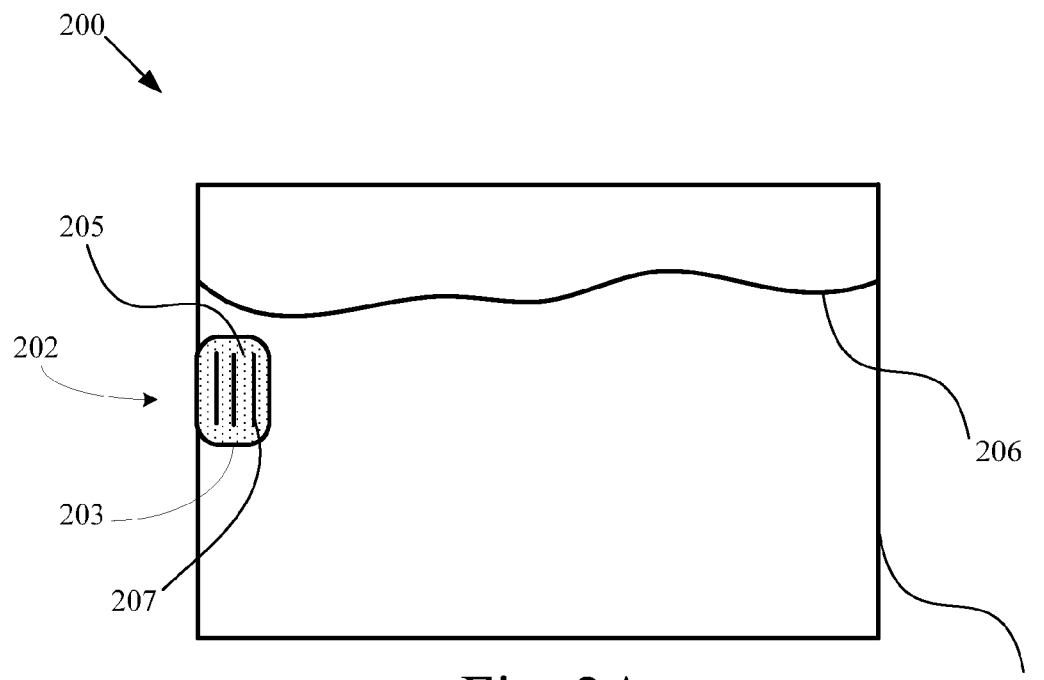
FIG. 2A is a cross-sectional view one embodiment of a system for using a defoaming apparatus.
Figure 2B:
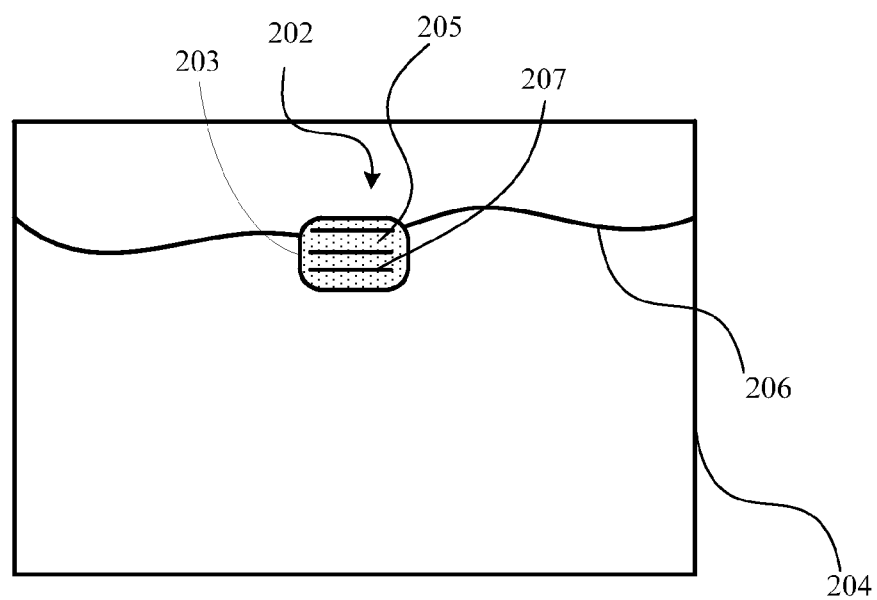
FIG. 2B is a cross-sectional view of another embodiment of a system for using a defoaming apparatus.

FIG. 2A is a cross-sectional view of one embodiment of a system 200 for using a defoaming apparatus 202. The defoaming apparatus 202 includes a carrier 203 that holds a defoaming agent 205. The carrier 203 substantially encapsulates the defoaming agent 205, but includes elements 207 for restrictively permitting (e.g., exuding) the defoaming agent 205 to diffuse into an aqueous solution 206 stored within a container 204. Functionally, the carrier 203 is analogous to the carrier material described above with reference to FIGS. 1A and 1B. In other words, the carrier is selected to control the dissolution and dispersion of the defoaming agent.

In one embodiment, for example, the carrier 203 includes a plastic container with slits 207 sized and shaped to allow the defoaming agent 205 to slowly and predictively weep out into an aqueous solution 206, thereby limiting the rate of release and limiting the amount of defoaming agent dispersed into the aqueous solution. In another embodiment, the carrier 203 may include a selectively permeable membrane 207 configured to control the rate and amount of the defoaming agent 205 diffused into the aqueous solution 206. In another embodiment, the apparatus 202 may include a selectively controllable regulator 207, such as a solenoid valve or metered dispenser mechanism, which periodically releases a fraction of the stored defoaming agent 205 into the aqueous solution 206. The defoaming apparatus 202 can be made by selecting a defoaming agent 205 and a carrier 203 and then loading the defoaming agent into the carrier 203. It is contemplated that other carrier devices, recognized by those of ordinary level of skill in the art as capable of containing and restrictively discharging powdered and/or liquid defoaming agents into an aqueous solution, fall within the scope of the present disclosure.

The apparatus 202 can be positioned within the container 204 in any number of configurations. As depicted in FIG. 2A, in one embodiment, the defoaming apparatus 202 is attached to an inner wall of the container 204 storing the aqueous solution 206. In another embodiment, as depicted in FIG. 1B, the defoaming apparatus 202 is not secured to any portion of the container 204, and is freely movable within the container 204. In such an embodiment, the apparatus 202 can be configured to float on the surface of the aqueous solution 206, or be wholly or partially submerged in the aqueous solution 206. It is contemplated that other positions and orientations of the defoaming apparatus 202 within the container 204 fall within the scope of the disclosure, provided that such other positions and orientations allow the defoaming apparatus 202 to be in at least partial fluid communication with the aqueous solution 206. The defoaming agent 205 may include any of various foam-reducing compounds. In one embodiment, the defoaming agent is in solid powdered form. In another embodiment, the defoaming agent is a liquid.

Figure 3:
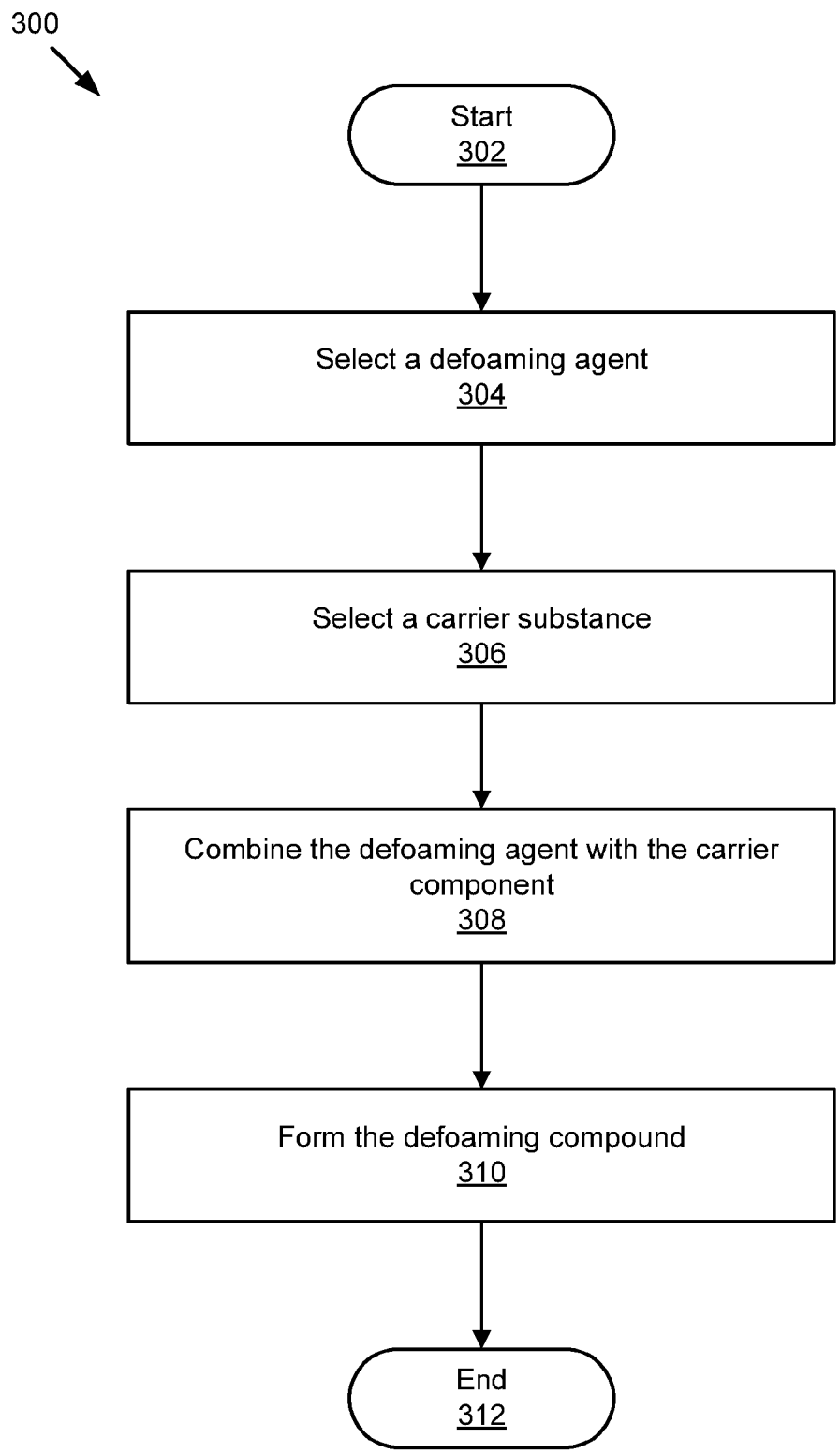
FIG. 3 is schematic block diagram illustrating one embodiment of a method for producing a defoaming substance.

FIG. 3 is schematic block diagram illustrating one embodiment of a method 300 for making a block of defoaming substance. The method begins 302 by selecting 304 a defoaming agent. The defoaming agent may be a single type of defoaming compound or it may be a combination of multiple types of defoaming compounds. For example, a foaming aqueous solution may contain anionic surfactants, cationic surfactants, non-ionic surfactants, silicone based surfactants, or other foam forming compounds. Accordingly, multiple defoamers may be selected 304 to counter each type of foam promoting surfactant. Other characteristics of the aqueous solution that may affect the selection 304 of a defoaming agent include the concentration, pH, temperature, pressure, viscosity, solids content, volatiles content, and flow rate.

The method 300 also includes selecting 306 a carrier material for the defoaming block. As discussed above, the carrier material principally functions as the solubility modifier of the defoaming agent. As identified above, one of the noteworthy shortcomings of conventional cleaning systems is the rapid dissolution of defoamers in aqueous solutions. A user must either continually add chemical defoamers to an aqueous solution or must repeatedly add defoaming chemicals if the cleaning is performed in batch operations. Therefore, selecting a carrier material may involve determining the proper solubility for a particular application in order to achieve restrictive or controlled dispersion of the defoaming agent. In one embodiment, a single organic or inorganic compound may be selected 306 as the carrier material. In another embodiment, the carrier material may include multiple organic or inorganic compounds, thereby allowing the user greater control over the solubility of the defoaming substance. It is contemplated that in one embodiment, the water solubility of the defoaming substance is in the range of between about 5 grams per liter and 1,000 grams per liter. In another embodiment, the water solubility of the defoaming substance is in the range of between about 10 grams per liter and 500 grams per liter. In yet another embodiment, the water solubility of the defoaming substance is about 100 grams per liter.

For example, in one embodiment in which the aqueous solution contains high concentrations of foam promoting surfactants, a carrier substance with a relatively high solubility may be selected in order to disperse more defoaming agent into the aqueous solution. However, if the solubility of the carrier substance is too high, the aqueous solution may dissolve the carrier material too quickly and cause an excess of defoaming agent to be dispersed, which can be wasteful and inefficient. Accordingly, the carrier material is selected to produce enough defoaming action as is necessary to combat excess foam, but not so much dispersion so as to waste defoaming agent. In another embodiment, instead of a single carrier material, multiple materials may be selected as the carrier material. With embodiments having multiple carrier materials, the user has greater control of the solubility of the final defoaming block because the solubility of the block is not limited to the solubility of a single carrier material, but the working average of multiple carrier materials. Therefore, upon mixing two or more molten organic acids together, the resulting compound will have an effective working solubility somewhat between the solubility of the independent organic acids. In this manner, the solubility of the block can be precisely selected according to the characteristics of a particular application.

Another factor that may be considered in selecting 306 a carrier substance is the melting point. As discussed in the next step of the method 300, in some embodiments the carrier substance is melted before mixing the defoaming agent with the carrier substance. In one embodiment, a carrier substance is selected with a melting point in the range of between about 50° C. and 200° C. By choosing a carrier substance with a melting point below 200° C., the current method 300 will not require excessively high temperatures, therefore reducing the amount of heat and energy required for the process. Additionally, by selecting a carrier substance with a melting point above 100° C., the user avoids any complications that may arise if the aqueous solution into which the defoaming compound were to be used was at a temperature high enough to melt the defoaming compound. Other than the potential issue of melting the carrier substance in the aqueous solution, the defoaming compound is substantially temperature independent. However, the selection of a carrier substance based on its melting point is a matter of convenience and therefore is not intended to limit the scope of the present disclosure.

The method further includes combining 308 the selected defoaming agent with the selected carrier material. In one embodiment, the combining 308 is performed by raising the temperature of an organic acid up to or slightly above its melting point, which causes the solid organic acid to melt and form a molten organic acid medium. Once molten, the carrier substance can be combined and uniformly mixed with a powdered defoaming agent. In another embodiment, an organic or inorganic solid is selected as the carrier substance and the carrier substance and the powdered defoaming agent are combined through compression fusing the two solids together. In yet another embodiment, combining the defoaming agent and carrier material may be performed by evaporative deposition of a defoaming agent onto the surface of the carrier substance. In one embodiment, the mass ratio of defoaming agent to carrier material is in the range of between about 1:1 and 1:100. In another embodiment, the mass ratio of defoaming agent to carrier material is in the range of between about 1:5 and 1:20. In yet another embodiment, the mass ratio of defoaming agent to carrier material is about 1:10. It is contemplated that other techniques recognized by those of ordinary level of skill in the art can be used to combine 308 the defoaming agent with the carrier substance without departing from the essence of the present disclosure.

Additionally, the method 300 includes forming 310 the combination of the defoaming agent and carrier material into a block of defoaming substance. In one embodiment, the defoaming block is formed by pouring a mixture of a molten organic acid medium and defoaming agent into a mold and allowing the mold to cool. The size and shape of the molds may be selected according to the requirements of the application to produce a defoaming block having a requisite size and shape. For example, a certain waste tank in a cleaning application may require cylindrical-shaped defoaming blocks with a specific diameter and length (e.g., about 3 inches in diameter and 0.5 inches in length). In another embodiment, the defoaming block is formed by compression fusing an organic or inorganic solid carrier substance and a defoaming agent into a block. After forming 310 the defoaming block at 310, the method 300 ends 312. The following experiments were conducted by substantially following the steps of the method 300.

Experiment 1

In one embodiment, 1 gram of 1920 Powdered defoamer (Dow Corning) was selected as the defoaming agent and 10 grams of adipic acid were selected as the carrier material, the adipic acid having a melting point of 152° C. and a water solubility of 14 grams per liter. The adipic acid was then heated until it reached a molten state, at which point the powdered defoamer was added and stirred into the molten acid. The molten mixture was poured into a mold and cooled to a solid. A 1 gram block of the resulting defoaming substance was then placed into 500 milliliters of a non-ionic surfactant solution (0.2% Tergitol 15-S-7 by Union Carbide). After shaking the solution, which caused about 3-4 inches of foam to form in the solution, the foam was knocked down to about ¼ inch. After 30 minutes, the block of defoaming substance was still intact with only a slight decrease in mass.

Experiment 2

In another embodiment, 1 gram of 1920 Powdered defoamer (Dow Corning) was selected as the defoaming agent and 10 grams of sorbic acid were selected as the carrier material, the sorbic acid having a melting point of 135° C. and a water solubility of 2.5 grams per liter. The sorbic acid was then heated until it reached a molten state, at which point the powdered defoamer was added and stirred into the molten acid. The molten mixture was poured into a mold and cooled to a solid. A 1 gram block of the resulting defoaming substance was then placed into 500 milliliters of a non-ionic surfactant solution (0.2% Tergitol 15-S-7 by Union Carbide). After shaking the solution, which caused about 3-4 inches of foam to form in the solution, a substantial portion of the foam remained and only a slight decrease in foam volume was noted. The low solubility of the sorbic acid in the defoaming substance restricted the dissolution and dispersion of the defoaming agent to the extent that limited defoaming occurred in the system. In other applications, however, it is contemplated that a lesser amount of foam may be produced and a correspondingly lesser amount of defoaming agent may be required to knock down the foam.

Experiment 3

In yet another embodiment of an experiment performed following the steps of the method for making a defoaming substance, 1 gram of 1920 Powdered defoamer (Dow Corning) was selected as the defoaming agent and 10 grams of glutaric acid were selected as the carrier material, the glutaric acid having a melting point of 100° C. and a water solubility of 429 grams per liter. The glutaric acid was then heated until it reached a molten state, at which point the powdered defoamer was added and stirred into the molten acid. The molten mixture was poured into a mold and cooled to a solid. A 1 gram block of the resulting defoaming substance was then placed into 500 milliliters of a non-ionic surfactant solution (0.2% Tergitol 15-S-7 by Union Carbide). After shaking the solution, which caused about 3-4 inches of foam to form in the solution, the foam was knocked down to about ¼ inch. After 30 minutes, the block of defoaming substance had noticeably decreased in volume. Because of the comparatively higher solubility of the glutaric, the defoaming agent dispersed quickly throughout the solution and the amount released may have been in excess of what was required to defoam the solution. It is contemplated, however, that some applications may produce comparatively greater amounts of foam and will require a correspondingly greater amount of defoaming agent.

Experiment 4

In another embodiment, 1 gram of 1920 Powdered defoamer (Dow Corning) was selected as the defoaming agent and a combination of the following acids were selected to constitute the carrier material: 4.5 grams of glutaric acid (100° C. melting point, solubility of 429 grams per liter of water), 3.0 grams of succinic acid (184° C. melting point, solubility of 58 grams per liter of water), and 2.5 grams of adipic acid (152° C. melting point, 14 grams per liter of water). The acids were then heated until they reached a molten state, at which point the powdered defoamer was added and stirred into the molten acids. The molten mixture was poured into a mold and cooled to a solid. A 1 gram block of the resulting defoaming substance was then placed into 500 milliliters of a non-ionic surfactant solution (0.2% Tergitol 15-S-7 by Union Carbide). After shaking the solution, which caused about 3-4 inches of foam to form in the solution, the foam was knocked down to about ¼ inch. After 30 minutes, the block of defoaming substance was still intact with only a slight decrease in noticeable volume. It was determined that combining multiple acids provides the user with greater control over the solubility of the final defoaming substance because the solubility of the defoaming substance is not limited to the solubility of a single organic acid, but the working average of multiple organic acids. In this manner, the solubility of the block can be precisely selected according to the characteristics of a particular application.

Experiment 5

In another embodiment, 1 gram of 1920 Powdered defoamer (Dow Corning) and 1 milliliter of Nofome 354 (StarChem in Wellsford, S.C.) was selected to constitute the defoaming agent and a combination of the following acids were selected to constitute the carrier material: 4.5 grams of glutaric acid (100° C. melting point, solubility of 429 grams per liter of water), 3.0 grams of succinic acid (184° C. melting point, solubility of 58 grams per liter of water), and 2.5 grams of adipic acid (152° C. melting point, 14 grams per liter of water). The acids were then heated until they reached a molten state, at which point the defoaming agents were added and stirred into the molten acids. The molten mixture was poured into a mold and cooled to a solid. A 1 gram block of the resulting defoaming substance was then placed into 500 milliliters of a surfactant-polymer solution (0.2% Tergitol 15-S-7 by Union Carbide; 0.06% sodium lauryl sulfate; 0.2% SMA 1000H by Sartomer Co.). After shaking the solution, which caused about 5-6 inches of foam to form in the solution, the foam was knocked down to about ¼ inch. After 30 minutes, the block of defoaming substance was still intact with only a slight decrease in noticeable volume. It was determined that combining multiple defoaming compounds provides the user with an increased ability to knock down foam that results from multiple types of surfactants.

Figure 4:
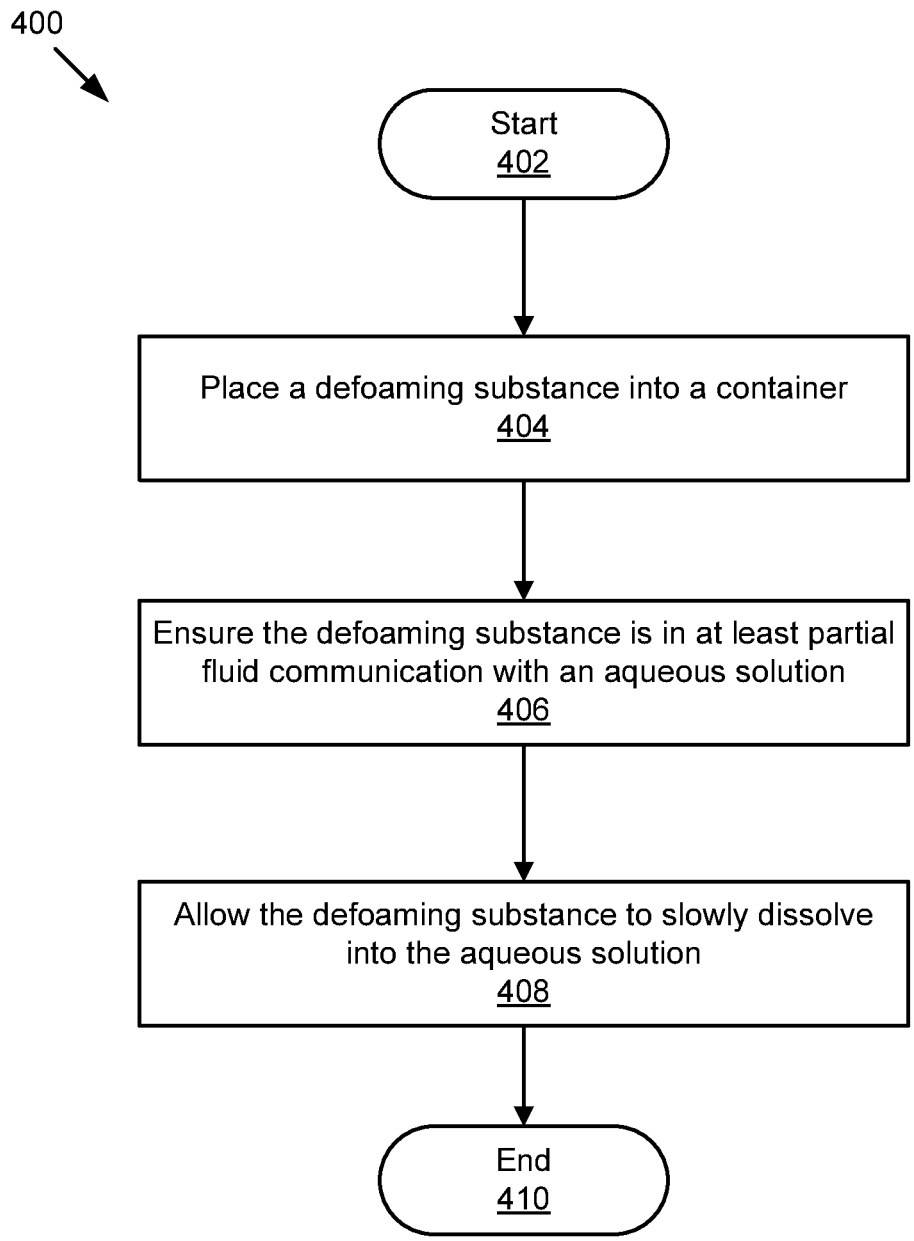
FIG. 4 is a schematic block diagram illustrating one embodiment of a method of using a defoaming substance to defoam an aqueous solution.

FIG. 4 is a schematic block diagram illustrating one embodiment of a method 400 of using a defoaming substance to defoam an aqueous solution. Once formed, the method 400 begins 402 by placing 404 a defoaming substance into a container. In one embodiment, the container already has an aqueous solution susceptible to foam formation. In another embodiment, the aqueous solution is suctioned or pumped into the container after the block of defoaming substance has been added to the container. The method 400 includes ensuring 406 that the defoaming substance is in at least partial fluid communication with the aqueous solution. As described above with reference to FIG. 1, the defoaming substance may be oriented in any of several different positions within the container. The method 400 further includes allowing 408 the defoaming substance to slowly dissolve into the aqueous solution and knock down the foam, after which the method 400 ends 410.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

Furthermore, the described features, structures, or characteristics of the disclosure may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the disclosure.

The schematic flow chart diagram included herein is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A defoaming substance for defoaming an aqueous solution, consisting of:
    a defoaming agent; and
    a carrier material intermixed with the defoaming agent to form a solid mass, the carrier material consisting of at least one organic acid;
    wherein the mass ratio of the defoaming agent to the carrier material is in the range of between about 1:5 and 1:20.

2. The defoaming substance of claim 1, wherein the carrier material consists of at least two different organic acids, wherein each organic acid has a different water solubility.

3. The defoaming substance of claim 1, wherein the defoaming agent comprises at least one type of silicon-based defoamer.

4. The defoaming substance of claim 1, wherein the carrier material has a melting point in the range of between about 50 degrees Celsius and 200 degrees Celsius.

5. The defoaming substance of claim 1, wherein the carrier material has a melting point of about 100 degrees Celsius.

6. The defoaming substance of claim 1, wherein the mass ratio of the defoaming agent to the carrier material is about 1:10.

7. A method for making a defoaming substance, consisting of:
    selecting a defoaming agent capable of hindering foam formation and reducing foam build-up in an aqueous solution;
    selecting a carrier material, wherein selecting the carrier material consists of selecting at least two different organic acids, wherein each organic acid has a different water solubility;
    combining the defoaming agent with the carrier material, wherein the mass ratio of the defoaming agent to the carrier material is in the range of between about 1:5 and 1:20; and
    forming the combined defoaming agent and carrier material into a solid defoaming substance.

8. The method of claim 7, wherein combining the defoaming agent with the carrier material comprises melting the carrier material and intermixing the defoaming agent and the carrier material.

9. The method of claim 8, wherein forming the defoaming agent and carrier material into a solid defoaming substance comprises placing the intermixed defoaming agent and the carrier material into a mold and allowing time to cool.

10. The method of claim 7, wherein combining the defoaming agent with the carrier material comprises compression fusing the defoaming agent together with the carrier material.

* * * * *